United States Patent
Balasubramanian et al.

(10) Patent No.: US 11,960,492 B2
(45) Date of Patent: Apr. 16, 2024

(54) METHODS AND SYSTEMS FOR DISPLAY OF SEARCH ITEM SCORES AND RELATED INFORMATION FOR EASIER SEARCH RESULT SELECTION

(71) Applicant: Open Weaver Inc., Miami, FL (US)

(72) Inventors: Ashok Balasubramanian, Chennai (IN); Karthikeyan Krishnaswamy Raja, Chennai (IN); Suresh Babu Konduru, Chennai (IN); Meenakshisundaram Chinnappan, Chennai (IN); Arul Reagan S, Chengalpattu District (IN)

(73) Assignee: Open Weaver Inc., Miami, FL (US)

( * ) Notice: Subject to any disclaimer, the term of this patent is extended or adjusted under 35 U.S.C. 154(b) by 0 days.

(21) Appl. No.: 17/678,930

(22) Filed: Feb. 23, 2022

(65) Prior Publication Data

US 2022/0269687 A1 Aug. 25, 2022

Related U.S. Application Data

(60) Provisional application No. 63/153,192, filed on Feb. 24, 2021.

(51) Int. Cl.
*G06F 16/2457* (2019.01)
*G06F 16/248* (2019.01)

(52) U.S. Cl.
CPC ...... *G06F 16/24578* (2019.01); *G06F 16/248* (2019.01)

(58) Field of Classification Search
None
See application file for complete search history.

(56) References Cited

U.S. PATENT DOCUMENTS

| 5,953,526 | A  | 9/1999 | Day et al.     |
|-----------|----|--------|----------------|
| 7,322,024 | B2 | 1/2008 | Carlson et al. |

(Continued)

FOREIGN PATENT DOCUMENTS

| CN | 108052442 A    | 5/2018 |
|----|----------------|--------|
| KR | 10-2020-0062917 | 6/2020 |

(Continued)

OTHER PUBLICATIONS

Iderli Souza, An Analysis of Automated Code Inspection Tools for PHP Available on Github Marketplace, Sep. 2021, pp. 10-17 (Year: 2021).

(Continued)

*Primary Examiner* — Kim T Nguyen
(74) *Attorney, Agent, or Firm* — Foley & Lardner LLP

(57) ABSTRACT

Systems and methods for displaying search item scores and related information for easier search result selection. In one aspect, the method includes receiving a search request for a software component, retrieving a programming language information of the software component, retrieving an ecosystem information of the software component, retrieving a licensing information of the software component, retrieving a quality score of the software component, retrieving a security score of the software component, retrieving details of sources and associated details of the software component, dynamically generating a results information widget including information associated with the software component, and searching, based on the retrieved information, internet sources to assimilate associated information of the software components.

23 Claims, 12 Drawing Sheets

(56) References Cited

U.S. PATENT DOCUMENTS

| | | |
|---|---|---|
| 7,703,070 B2 | 4/2010 | Bisceglia |
| 7,774,288 B2 | 8/2010 | Acharya et al. |
| 7,958,493 B2 | 6/2011 | Lindsey et al. |
| 8,010,539 B2 | 8/2011 | Blair-Goldensohn et al. |
| 8,051,332 B2 | 11/2011 | Zakonov et al. |
| 8,112,738 B2 | 2/2012 | Pohl et al. |
| 8,112,744 B2 | 2/2012 | Geisinger |
| 8,219,557 B2 | 7/2012 | Grefenstette et al. |
| 8,296,311 B2 | 10/2012 | Rapp et al. |
| 8,412,813 B2 | 4/2013 | Carlson et al. |
| 8,417,713 B1 | 4/2013 | Blair-Goldensohn et al. |
| 8,452,742 B2 | 5/2013 | Hashimoto et al. |
| 8,463,595 B1 | 6/2013 | Rehling et al. |
| 8,498,974 B1 | 7/2013 | Kim et al. |
| 8,627,270 B2 | 1/2014 | Fox et al. |
| 8,677,320 B2 | 3/2014 | Wilson et al. |
| 8,688,676 B2 | 4/2014 | Rush et al. |
| 8,838,606 B1 | 9/2014 | Cormack et al. |
| 8,838,633 B2 | 9/2014 | Dhillon et al. |
| 8,935,192 B1 | 1/2015 | Ventilla et al. |
| 8,943,039 B1 | 1/2015 | Grieselhuber et al. |
| 9,015,730 B1 | 4/2015 | Allen et al. |
| 9,043,753 B2 | 5/2015 | Fox et al. |
| 9,047,283 B1 | 6/2015 | Zhang et al. |
| 9,135,665 B2 | 9/2015 | England et al. |
| 9,176,729 B2 | 11/2015 | Mockus et al. |
| 9,201,931 B2 | 12/2015 | Lightner et al. |
| 9,268,805 B2 | 2/2016 | Crossley et al. |
| 9,330,174 B1 | 5/2016 | Zhang |
| 9,361,294 B2 | 6/2016 | Smith |
| 9,390,268 B1 | 7/2016 | Martini et al. |
| 9,471,559 B2 | 10/2016 | Castelli et al. |
| 9,558,098 B1 | 1/2017 | Alshayeb et al. |
| 9,589,250 B2 | 3/2017 | Palanisamy et al. |
| 9,626,164 B1 | 4/2017 | Fuchs |
| 9,672,554 B2 | 6/2017 | Dumon et al. |
| 9,977,656 B1 | 5/2018 | Mannopantar et al. |
| 10,305,758 B1 | 5/2019 | Bhide et al. |
| 10,474,509 B1 | 11/2019 | Dube et al. |
| 10,484,429 B1 | 11/2019 | Fawcett et al. |
| 10,761,839 B1 | 9/2020 | Migoya et al. |
| 10,922,740 B2 | 2/2021 | Gupta et al. |
| 11,288,167 B2 | 3/2022 | Vaughan |
| 11,294,984 B2* | 4/2022 | Kittur ................. G06F 7/00 |
| 11,295,375 B1 | 4/2022 | Chitrapura et al. |
| 11,301,631 B1 | 4/2022 | Atallah et al. |
| 11,334,351 B1 | 5/2022 | Pandurangarao et al. |
| 11,461,093 B1 | 10/2022 | Edminster et al. |
| 11,474,817 B2 | 10/2022 | Sousa et al. |
| 11,893,117 B2 | 2/2024 | Segal et al. |
| 2001/0054054 A1 | 12/2001 | Olson |
| 2002/0059204 A1 | 5/2002 | Harris |
| 2002/0150966 A1 | 10/2002 | Muraca |
| 2002/0194578 A1 | 12/2002 | Irie et al. |
| 2004/0243568 A1 | 12/2004 | Wang et al. |
| 2006/0090077 A1 | 4/2006 | Little et al. |
| 2006/0104515 A1 | 5/2006 | King et al. |
| 2006/0200741 A1 | 9/2006 | Demesa et al. |
| 2006/0265232 A1 | 11/2006 | Katariya et al. |
| 2007/0050343 A1 | 3/2007 | Siddarampappa et al. |
| 2007/0185860 A1 | 8/2007 | Lissack |
| 2007/0234291 A1 | 10/2007 | Ronen et al. |
| 2007/0299825 A1 | 12/2007 | Rush et al. |
| 2009/0043612 A1* | 2/2009 | Szela, Jr. ............ G16H 10/40 705/3 |
| 2009/0319342 A1 | 12/2009 | Shilman et al. |
| 2010/0106705 A1 | 4/2010 | Rush et al. |
| 2010/0121857 A1 | 5/2010 | Elmore et al. |
| 2010/0174670 A1 | 7/2010 | Malik et al. |
| 2010/0205198 A1 | 8/2010 | Mishne et al. |
| 2010/0205663 A1 | 8/2010 | Ward et al. |
| 2010/0262454 A1 | 10/2010 | Sommer et al. |
| 2011/0231817 A1 | 9/2011 | Hadar et al. |
| 2012/0143879 A1 | 6/2012 | Stoitsev |
| 2012/0259882 A1 | 10/2012 | Thakur et al. |
| 2012/0278064 A1 | 11/2012 | Leary et al. |
| 2013/0103662 A1 | 4/2013 | Epstein |
| 2013/0117254 A1 | 5/2013 | Manuel-Devadoss et al. |
| 2013/0326469 A1 | 12/2013 | Fox et al. |
| 2014/0040238 A1 | 2/2014 | Scott et al. |
| 2014/0075414 A1 | 3/2014 | Fox et al. |
| 2014/0122182 A1 | 5/2014 | Cherusseri et al. |
| 2014/0149894 A1 | 5/2014 | Watanabe et al. |
| 2014/0163959 A1 | 6/2014 | Hebert et al. |
| 2014/0188746 A1 | 7/2014 | Li |
| 2014/0297476 A1 | 10/2014 | Wang et al. |
| 2014/0331200 A1 | 11/2014 | Wadhwani et al. |
| 2014/0337355 A1 | 11/2014 | Heinze |
| 2015/0127567 A1 | 5/2015 | Menon et al. |
| 2015/0220608 A1 | 8/2015 | Crestani Campos et al. |
| 2015/0331866 A1 | 11/2015 | Shen et al. |
| 2016/0253688 A1 | 9/2016 | Nielsen et al. |
| 2016/0350105 A1 | 12/2016 | Kumar et al. |
| 2016/0378618 A1 | 12/2016 | Cmielowski et al. |
| 2017/0034023 A1* | 2/2017 | Nickolov ............ H04L 43/0817 |
| 2017/0063776 A1 | 3/2017 | Nigul |
| 2017/0154543 A1 | 6/2017 | King et al. |
| 2017/0220633 A1 | 8/2017 | Porath et al. |
| 2017/0286541 A1 | 10/2017 | Mosley et al. |
| 2017/0286548 A1* | 10/2017 | De ....................... G06F 16/2428 |
| 2018/0046609 A1 | 2/2018 | Agarwal et al. |
| 2018/0067836 A1 | 3/2018 | Apkon et al. |
| 2018/0114000 A1* | 4/2018 | Taylor ................. H04L 9/0643 |
| 2018/0329883 A1 | 11/2018 | Leidner et al. |
| 2018/0349388 A1 | 12/2018 | Skiles et al. |
| 2019/0229998 A1 | 7/2019 | Cattoni |
| 2019/0278933 A1 | 9/2019 | Bendory et al. |
| 2019/0286683 A1* | 9/2019 | Kittur ................. G06F 16/9535 |
| 2019/0311044 A1 | 10/2019 | Xu et al. |
| 2019/0324981 A1 | 10/2019 | Counts et al. |
| 2020/0110839 A1 | 4/2020 | Wang et al. |
| 2020/0125482 A1 | 4/2020 | Smith et al. |
| 2020/0133830 A1 | 4/2020 | Sharma et al. |
| 2020/0293354 A1 | 9/2020 | Song et al. |
| 2020/0301672 A1 | 9/2020 | Li et al. |
| 2020/0301908 A1 | 9/2020 | Frost et al. |
| 2020/0348929 A1 | 11/2020 | Sousa et al. |
| 2020/0356363 A1 | 11/2020 | Dewitt et al. |
| 2021/0049091 A1 | 2/2021 | Hikawa et al. |
| 2021/0073293 A1 | 3/2021 | Fenton et al. |
| 2021/0081189 A1 | 3/2021 | Nucci et al. |
| 2021/0141863 A1 | 5/2021 | Wu et al. |
| 2021/0149658 A1 | 5/2021 | Cannon et al. |
| 2021/0149668 A1 | 5/2021 | Gupta et al. |
| 2021/0349801 A1 | 11/2021 | Rafey |
| 2021/0357210 A1 | 11/2021 | Clement et al. |
| 2021/0382712 A1 | 12/2021 | Richman et al. |
| 2021/0397418 A1 | 12/2021 | Nikumb et al. |
| 2022/0012297 A1 | 1/2022 | Basu et al. |
| 2022/0083577 A1 | 3/2022 | Yoshida et al. |
| 2022/0215068 A1* | 7/2022 | Kittur ................. G06F 16/9535 |
| 2022/0269687 A1* | 8/2022 | Balasubramanian ........ G06F 16/248 |
| 2022/0269743 A1* | 8/2022 | Balasubramanian ........ G06F 21/577 |
| 2022/0269744 A1* | 8/2022 | Balasubramanian ........ G06F 16/951 |
| 2023/0308700 A1 | 9/2023 | Perez |

FOREIGN PATENT DOCUMENTS

| | | |
|---|---|---|
| WO | WO-2007/013418 A1 | 2/2007 |
| WO | WO-2020/086773 A1 | 4/2020 |

OTHER PUBLICATIONS

Khatri et al, "Validation of Patient Headache Care Education System (PHCES) Using a Software Reuse Reference Model", Journal of System Architecture, pp. 157-162 (Year: 2001).

Lotter et al, "Code Reuse in Stack Overflow and Popular Open Source Java Projects", IEEE, pp. 141-150 (Year: 2018).

(56) References Cited

OTHER PUBLICATIONS

Rothenberger et al, "Strategies for Software Reuse: A Principal Component Analysis of Reuse Practices", IEEE, pp. 825-837 (Year:2003).
Tung et al, "A Framework of Code Reuse in Open Source Software", ACM, pp. 1-6 (Year: 2014).
Lampropoulos et al, "REACT—A Process for Improving Open-Source Software Reuse", IEEE, pp. 251-254 (Year: 2018).
Leclair et al., "A Neural Model for Generating Natural Language Summaries of Program Subroutines," Collin McMillan, Dept. of Computer Science and Engineering, University of Notre Dame Notre Dame, IN, USA, Feb. 5, 2019.
Schweik et al, Proceedings of the OSS 2011 Doctoral Consortium, Oct. 5, 2011, Salvador, Brazil, pp. 1-100, Http:/Avorks.bepress.com/charles_schweik/20 (Year: 2011).
Stanciulescu et al, "Forked and Integrated Variants in an Open-Source Firmware Project", IEEE, pp. 151-160 (Year: 2015).
Zaimi et al, ":An Empirical Study on the Reuse of Third-Party Libraries in Open-Source Software Development", ACM, pp. 1-8 (Year: 2015).
M. Squire, "Should We Move to Stack Overflow?" Measuring the Utility of Social Media for Developer Support, 2015 IEEE/ACM 37th IEEE International Conference on Software Engineering, Florence, Italy, 2015, pp. 219-228, doi: 10.1109/ICSE.2015.150. (Year: 2015).
S. Bayati, D. Parson, T. Sujsnjak and M. Heidary, "Big data analytics on large-scale socio-technical software engineering archives," 2015 3rd International Conference on Information and Communication Technology (IColCT), Nusa Dua, Bali, Indonesia, 2015, pp. 65-69, doi: 10.1109/IColCT.2015.7231398. (Year: 2015).
Andreas DAutovic, "Automatic Assessment of Software Documentation Quality", published by IEEE, ASE 2011, Lawrence, KS, USA, pp. 665-669, (Year: 2011).

\* cited by examiner

METHODS AND SYSTEMS FOR DISPLAY OF SEARCH ITEM SCORES AND RELATED INFORMATION FOR EASIER SEARCH RESULT SELECTION

CROSS-REFERENCE TO RELATED PATENT APPLICATION

This application claims the benefit of and priority to U.S. Provisional Patent Application No. 63/153,192 filed Feb. 24, 2021, the entire disclosure of which is incorporated by reference herein.

TECHNICAL FIELD

The present disclosure relates to methods and systems for providing information related to software components for easy understanding for scenarios like search listing and can be used in conjunction with a search engine or other short-listing products for software components.

BACKGROUND

With open-source technologies, cloud based public code repositories and cloud based applications increasing exponentially, there is a need for software developers to have a way to find such software components for use in their software development. Today there are more than 30 million public code repositories and 100,000 public application programmable interfaces (APIs). There are few 100 million articles that provide knowledge, review of the software components.

Considering some patents that are in this same field of technology, U.S. Pat. No. 8,296,311 discloses a search middleware which is used to receive search requests regarding a software incident associated with a software application. The search requests may be populated with attribute values determined based on context data associated with the software application and collected in association with the software incident. The search requests may be dispatched to a subset of a plurality of solution repositories, even if the solution repositories have different interfaces and/or search technologies. The resulting solution documents retrieved from the solution repositories may be compiled for presentation on a solution search interface. However, this disclosure is silent regarding providing language and license retrieval, and provision of quality scores for the software components.

U.S. Pat. No. 8,498,974 discloses a computer-implemented method for processing query information includes receiving data representative of a search query from a user search session. The method also includes identifying a plurality of search results based upon the search query. Each search result is associated with a plurality of user characteristics and data that represents requestor behavior relative to previously submitted queries associated with the respective search result. The method also includes ordering the plurality of user characteristics based upon the data that represents requestor behavior relative to previously submitted queries and the respective search result. The method also includes adjusting the ordered plurality of user characteristics based upon at least one predefined compatibility associated with the user characteristics. The method also includes ranking the search results based upon the adjusted plurality of user characteristics. However, this disclosure is silent regarding providing language and license retrieval, and provision of security related scores for the software components.

United States Patent Application Publication No. 2004/0243568A1 discloses a search engine architecture that is designed to handle a full range of user queries, from complex sentence-based queries to simple keyword searches. The search engine architecture includes a natural language parser that parses a user query and extracts syntactic and semantic information. The parser is robust in the sense that it not only returns fully parsed results (e.g., a parse tree), but is also capable of returning partially parsed fragments in those cases where more accurate or descriptive information in the user query is unavailable. A question matcher is employed to match the fully parsed output and the partially parsed fragments to a set of frequently asked questions (FAQs) stored in a database. The question matcher then correlates the questions with a group of possible answers arranged in standard templates that represent possible solutions to the user query. The search engine architecture also has a keyword searcher to locate other possible answers by searching on any keywords returned from the parser. The answers returned from the question matcher and the keyword searcher are presented to the user for confirmation as to which answer best represents the user's intentions when entering the initial search query. The search engine architecture logs the queries, the answers returned to the user, and the user's confirmation feedback in a log database. The search engine has a log analyzer to evaluate the log database to glean information that improves performance of the search engine over time by training the parser and the question matcher. However, this disclosure is silent on features that are directed towards display of scores for the searched items and associated information for easy selection of search results.

U.S. Pat. No. 8,627,270 discloses a computer system is provided, comprising: a transceiver; and a processor configured to facilitate collecting and storing information related to a software project having one or more software artifacts, the information including: a project identifier, artifact identifiers for the artifacts used by the project, information about the temporal version for the artifacts, and contact information for a project user. Artifact metadata associated with the software artifacts is collected from a repository, which includes information identifying the artifact, information about security risks associated with the artifact, information about a license associated with the artifact, or information indicative of a level of use or user rating of the artifact. Periodical monitoring of the metadata is performed to determine whether there has been any actionable change in the artifact metadata; and the project user is notified using the contact information if it is determined that there has been an actionable change in the artifact metadata. However, this disclosure is silent on features that are directed towards display of scores for the searched items and associated information for easy selection of search results.

United States Patent Application Publication No. 2011/0231817A1 discloses a system that includes one or more computer processors that are configured to receive parameters relating to non-functional attributes of a proposed software component, parameters relating to non-functional attributes of one or more available software components, and a weight for each of the non-functional attributes. The system calculates a quality and a risk for each available software component as a function of the parameters of the proposed software component, the parameters for the one or more available software components, and the weight for each of the non-functional attributes. The system outputs to a display device one or more of the qualities and the risk for the one or more available software components. However, this disclosure does not take into consideration ecosystem score, languages, license. Furthermore, user preferences are not considered, and machine learning techniques are not used.

U.S. Pat. No. 8,935,192 discloses methods, systems, and apparatus, including computer programs, for a social search engine. In one aspect, a method includes receiving an answer to a question from an answerer; identifying an entity in the answer, in which the entity refers to a product, a service, a company, or a merchant. Permission is obtained from the answerer to provide an interactive link for the entity in the answer to a resource from which the entity can be obtained and a user submitted query is received to determine whether the query is related to the entity. The answer is provided in response to the determining step, including the link to the resource, as part of search results that are responsive to the query. However, this disclosure is silent on features that are directed towards display of scores for the searched items and associated information for easy selection of search results.

United States Patent Application Publication No. 2006/0265232A1 discloses an adaptive customer assistance system that serves as an integrated online and offline help platform for a suite of software products. The assistance system includes a customer-interaction interface and a data management component and a download management component for distributed customer interaction. The data management component includes an authoring component, a download component, a runtime component and an analysis component. The runtime component, which includes a customer assistance model, is configured to receive a user-formulated question from the customer-interaction interface. The runtime component provides an answer to the user-formulated question based on information included in the customer assistance model. The analysis component automatically analyzes, in substantially real-time, the user-formulated question and the corresponding answer, and provides an analysis output for use in improving a quality of customer assistance. However, this disclosure is silent on features that are directed towards ecosystem score, languages, license and user preferences and machine learning techniques.

U.S. Pat. No. 8,112,744 discloses a system for self-assembling software components. In one embodiment, a system includes a first and second set of language components, where each language component defines at least one part of language runnable on a computer by associating a piece of grammar of the language with at least one software component that implements the piece of grammar. The system further includes a request broker that upon being provided with a section of code written in the language matches syntactic appearances of the first set of language components in the section of code and granting logic to grant access to the language components of the first set whose syntactic appearances the request broker matched, to enable self-assemblage of the language components of the first set with language components of the second set. However, this disclosure is silent on features that are directed towards display of scores for the searched items and associated information for easy selection of search results.

U.S. Pat. No. 9,672,554 discloses methods and systems for analyzing, ordering and presenting item listings. In one example embodiment, a search query is processed to identify item listings satisfying the search query. Then, for each item listing that satisfies the search query, a ranking score is derived and assigned to the item listing. The ranking score is based in part on a relevance score, a listing quality score and a business rules score (or, adjustment factor). Finally, the item listings are ordered, based on their corresponding ranking score, and presented in order in a search results page. However, this disclosure is limited to describing regarding the order of the items to be presented and is silent on display of attributes of the library.

U.S. Pat. No. 8,452,742B2 discloses a software configuration management system which includes a software component database and a software product management unit and accepts data transmission/reception from a software component database management client and a software product operation client. The software configuration management system further includes: a component-product correspondence table, component-file correspondence information, a synchronization unit for mutually committing a modification of the software component database and a modification of a software product; update information; and a correspondence table update unit. However, this disclosure is silent on features that are directed towards display of scores for the searched items and associated information for easy selection of search results.

United States Patent Application Publication No. 2007/0234291A1 discloses methods, systems, and software for utilizing development components or other enterprise content whether developed internally or by third parties. One method for utilizing reusable development components includes presenting an interface to a remote user operable to display information for at least a first and a second development component. In some cases, the first development component is a first type of enterprise application content and the second development component of a second type of enterprise application content. The user is then allowed to update some portion of metadata associated with the first development component. However, this disclosure is silent on features that are directed towards display of scores for the searched items and associated information for easy selection of search results.

United States Patent Application No. 2002/0194578A1 discloses a software component library management system, which can effectively support both a component utilization user and a component management user in carrying out their business tasks. The component management tool includes a component retrieve/pickup function unit and a component administration/registration function unit. The component administration/registration function unit is adapted to make registrations of attribute information on software components stored in the component database, such as relation information items representing relations between the software component and other software components. The component retrieve/pickup function unit can retrieve and pickup a batch of software components related to a specific software component, based on the relation information items. The relation information item includes a slave link used to identify a slave component which a certain software component uses (slave information item), and a master link used to identify a master component by which a certain software component is used (master information item). However, this disclosure is silent on features that are directed towards display of scores for the searched items and associated information for easy selection of search results.

In view of the state of prior art as described above, even with a dedicated search engine that provides specialized search and retrieval of software components, it is difficult for a developer to decide which component choice should be selected from the displayed list. Because of this the developer will have to spend a lot of time to review each component and since the process is manual, it is prone to errors.

SUMMARY

The present disclosure provides techniques that puts together all relevant information of the software component and displays it concisely and in an easy to interpret format. This will enable the developer to get all critical details of the software component in the same search listing window, in an easy-to-understand format, significantly saving time and eliminating manual review errors.

A system for display of search item scores and related information for easier search result selection. A results information builder to capture a search request and decide on required information components and coordinates with different services to generate information. A language retrieval service to provide a programming language information of a software component. An ecosystem retrieval service to provide an ecosystem information of the software component. A license retrieval service to provide a licensing information of the software component. A quality retrieval service to provide a quality score of the software component and a security retrieval service to provide a security score of the software component. A source details retrieval service to provide details of sources and associated details of the software component and a results information widget generator that dynamically assembles and generates listing information associated with the software component. A software information crawler crawls internet sources to assimilate associated information of the software components.

In an embodiment, Results Information Builder is configured to decide on list of the information required and template based on the search request, type of listing required, and user preferences, wherein the user preferences are one of explicit choices and machine learnt based on user behavior of that user or a set of users using information in equivalent listings. In the same embodiment, Results Information Builder is configured to decide parameters that need to be used for this list of the information that comprise programming language, ecosystem information such as popularity, support, licensing information, quality, security, and diverse sources of that software component. In the same embodiment, the Results Information Builder is configured to coordinate with whole or selected services across the Language Retrieval Service, the Ecosystem Retrieval Service, the License Retrieval Service, the Quality Retrieval Service, the Security Retrieval Service, the Source Details Retrieval Service to collate the information details.

In an embodiment, the Language Retrieval Service is configured to leverage machine learning technologies to provide most relevant one or more programming languages that the software component is available based on context of the user. In the same embodiment, the Language Retrieval Service is configured to cover complete set of software programming languages, technologies, frameworks; and down-select based on the user preference shared or based on this user or other user behavior, according to the technologies that most frequently used and context of the search. In an embodiment, the Ecosystem Retrieval Service is configured to leverage machine learning technologies to compute an ecosystem score for the software component, wherein the ecosystem score is built based on software popularity, number of downloads, number of answered questions and the rate of closure of issues.

In an embodiment, the License Retrieval Service is configured to leverage machine learning technologies to provide the most relevant licenses that the software component is available based on the context of the user, and prioritize and interpret licenses based on the commercial construct that the user is leveraging, and their implementation context. In the same embodiment, the License Retrieval Service is configured to down-select based on the user preference shared or based on this user or other user behavior, according to the licenses that are most frequently used and the context of the implementation; and display an alert icon to help the user decide, if based on the license applicability to the context of the search, the license type is non-conformant.

In an embodiment, the Quality Retrieval Service is configured to leverage the machine learning technologies to compute the quality score for the software component, wherein the quality score is built based on total number of bugs, open bugs, software code scan performance and rate of closure of issues. In an embodiment, the Security Retrieval Service is configured to leverage machine learning technologies to compute the security score for the software component, wherein the security score is built based on total number of bugs, open bugs, software code scan performance and rate of closure of issues.

In an embodiment, the Source Details Retrieval Service is configured to leverage the machine learning technologies to retrieve and provide most relevant sources where the software component is available based on the context of the user and compare the same software component available with a plurality of hosting providers and in multiple formats that comprise source code, API, and library. In the same embodiment, the Source Details Retrieval Service is configured to down-select based on one of the user preferences shared and based on this user or other user behavior, according to the sources that are most frequently used and the context of this search; and retrieve relevant software component summary, author's name and last updated date and the last updated date translated to an easy to compare format that is similar to number of days ago.

In an embodiment, the Results Information Widget Generator is configured to consolidate information parameters from the different information component services that have been processed and converts it to the format required, wherein the formats include messages comprising json, xml or fully usable UI components across the computer, tablet, mobile screens in a responsive technology. In an embodiment, the Software Information Crawler is configured to crawl the internet sources that comprise public repositories, cloud providers, Question and Answers (Q&A), review sites, vulnerability databases; and parse and store information on programming language, licenses, sources, support, popularity, quality, and security information into a file storage.

One aspect includes a system for displaying search item scores and related information for easier search result selection, the system comprising: one or more processors and memory storing instructions that, when executed by the one or more processors, cause the one or more processors to perform operations comprising: receiving a search request for a software component; retrieving a programming language information of the software component; retrieving an ecosystem information of the software component; retrieving a licensing information of the software component; retrieving a quality score of the software component; retrieving a security score of the software component; retrieving details of sources and associated details of the software component; dynamically generating a results information widget including information associated with the software component; and searching, based on the retrieved information, internet sources to assimilate associated information of the software components.

In some embodiments, the operations further comprise: determining a list of the information required and template based on the search request, type of listing required, and user preferences, wherein the user preferences are one of explicit choices and machine learnt based on user behavior of that user or a set of users using information in equivalent listings; and determining parameters that need to be used for this list of the information that comprise programming language, ecosystem information, licensing information, quality, security, and diverse sources of that software component.

In some embodiments, the operations further comprise: provide, based on results of a machine learning model, most relevant one or more programming languages that the software component is available based on context of the user including software programming languages, technologies, and frameworks; and down-selecting based on the user preference shared or based on this user or other user behavior, according to the technologies that most frequently used and context of the search.

In some embodiments, the operations further comprise generating an ecosystem score, based on results of a machine learning model, for the software component, wherein the ecosystem score is built based on one or more of software popularity, number of downloads, number of answered questions, or rate of closure of issues.

In some embodiments, the operations further comprise: providing, based on results of a machine learning model, the most relevant licenses that the software component is available based on the context of the user; interpreting licenses, based on the commercial construct that the user is leveraging, and their implementation context; down-selecting based on the user preference shared or based on this user or other user behavior, according to the licenses that are most frequently used and the context of the implementation; and displaying an alert icon to help the user decide, if based on the license applicability to the context of the search, the license type is non-conformant.

In some embodiments, the operations further comprise computing a quality score, based on results of a machine learning model, for the software component, wherein the quality score is built based on one or more of total number of bugs, open bugs, software code scan performance, or rate of closure of issues.

In some embodiments, the operations further comprise computing, based on results of a machine learning model, a security score for the software component, wherein the security score is built based on one or more of total number of bugs, open bugs, software code scan performance, or rate of closure of issues.

In some embodiments, the operations further comprise: providing, based on results of a machine learning model, most relevant sources where the software component is available based on the context of the user; comparing the same software component available with a plurality of hosting providers and in multiple formats that comprise source code, API, and library; down-selecting based on one of the user preferences shared and based on this user or other user behavior, according to the sources that are most frequently used and the context of this search; and retrieving relevant software component summary, author's name and last updated date.

In some embodiments, the operations further comprise: consolidating the retrieved information; and converting the consolidated information to a format including one or more messages comprising JSON, XML, or fully usable UI components across the computer, tablet, mobile screens in a responsive technology.

In some embodiments, the operations further comprise: crawling internet sources that comprise public repositories, cloud providers, Question and Answers (Q&A), review sites, and vulnerability databases; parsing and storing information on programming language, licenses, sources, support, popularity, quality, and security information into a file storage.

Another aspect is a method of displaying search item scores and related information for easier search result selection, the method comprising: receiving a search request for a software component; retrieving a programming language information of the software component; retrieving an ecosystem information of the software component; retrieving a licensing information of the software component; retrieving a quality score of the software component; retrieving a security score of the software component; retrieving details of sources and associated details of the software component; dynamically generating a results information widget including information associated with the software component; and searching, based on the retrieved information, internet sources to assimilate associated information of the software components.

In some embodiments, the method further comprises determining a list of the information required and template based on the search request, type of listing required, and user preferences.

In some embodiments, the method further comprises processing user preferences that comprise one of explicit choices, machine learnt based on user behavior of that user, and a set of users using information in equivalent listings.

In some embodiments, the method further comprises determining parameters that need to be used for the equivalent listings that comprises programming language, ecosystem information, licensing information, quality, security, and diverse sources of that software component.

In some embodiments, the method further comprises providing, based on results of a machine learning model, the most relevant one or more programming languages, wherein the software component is available based on a context of the user covering all software programming languages, technologies and frameworks; and down-selecting based on one of the user preference shared and this user or other user behavior, according to the technologies that are most frequently used and the context of this search.

In some embodiments, the method further comprises computing, based on results of a machine learning model, the ecosystem score for the software component based on one or more of the software popularity, number of downloads, number of answered questions, or rate of closure of issues.

In some embodiments, the method further comprises providing, based on results of a machine learning model, most relevant licenses, wherein the software component is available based on the context of the user, which is prioritized and interpreted based on the commercial construct that the user is leveraging and their implementation context, and further down-selected based on one of the user preference shared and this user or other user behavior, according to the licenses that are most frequently used and the implementation context, and providing an alert based on non-conformant licenses.

In some embodiments, the method further comprises computing, based on results of a machine learning model, a quality score for the software component based on one or more of total number of bugs, open bugs, software code scan performance, or rate of closure of issues.

In some embodiments, the method further comprises computing, based on results of a machine learning model, a security score for the software component based on total number of bugs, open bugs, software code scan performance and rate of closure of issues.

In some embodiments, the method further comprises: providing, based on results of a machine learning model, most relevant sources where the software component is available based on the context of the user across multiple hosting providers and in multiple formats comprising source code, API, library; down-selecting based on one of the user preference shared and on this user or other user behavior, according to the sources that are most frequently used and the context of this search; and retrieving relevant software component summary, author name and last updated date and the last updated date translated to an easy to compare format that is similar to number of days ago.

In some embodiments, the method further comprises: consolidating information parameters from different information component services that have been processed; and converting the consolidated information parameters to a format required comprising one of JSON, XML, and fully usable UI components across the computer, tablet, mobile screens in a responsive technology.

In some embodiments, the method further comprises: crawling internet sources that comprise public repositories, cloud providers, Q&A, review sites, vulnerability databases; and parsing and storing information on the programming language, licenses, sources, support, popularity, quality, and security information into a file storage.

Another aspect is a computer program product for displaying search item scores and related information for easier search result selection comprising a processor and memory storing instructions thereon, wherein the instructions when executed by the processor cause the processor to perform operations comprising: receiving a search request for a software component; retrieving a programming language information of the software component; retrieving an ecosystem information of the software component; retrieving a licensing information of the software component; retrieving a quality score of the software component; retrieving a security score of the software component; retrieving details of sources and associated details of the software component; dynamically generating a results information widget including information associated with the software component; and searching, based on the retrieved information, internet sources to assimilate associated information of the software components.

BRIEF DESCRIPTION OF THE DRAWINGS

The disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Like reference numbers and designations in the various drawings indicate like elements.

DETAILED DESCRIPTION

To eliminate the manual review errors and to significantly reduce the time taken for the developer to review the choices from a list of software components listed, we propose a solution that retrieves all relevant information to the software component and displays it concisely and in an easy to interpret format. So now the developer can get all critical details in the same listing window, in an easy-to-understand format, significantly saving time and eliminating manual review errors.

Figure 1:
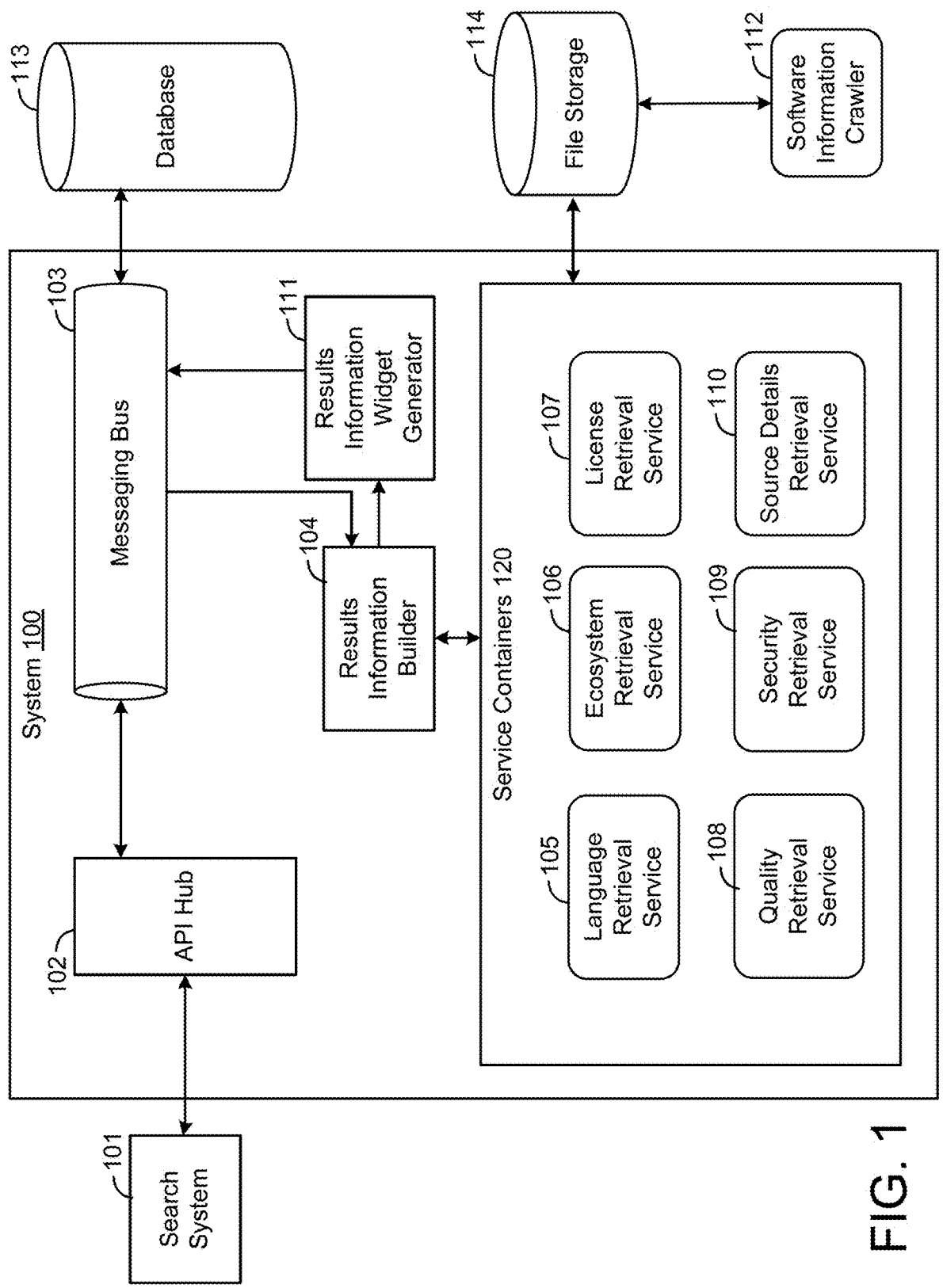
FIG. 1 shows a system architecture that performs display of search item scores and related information for easier search result selection, in accordance with some embodiments.

FIG. 1 shows a system 100 or a high-level architecture that does display of search item scores and related information for easier search result selection, in accordance with some embodiments. Briefly, and as described in further detail below, the system 100 discloses an API Hub 102, Messaging Bus 103, and Results Information Builder 104. The System 100 includes Service Containers 120 including Language Retrieval Service 105, Ecosystem Retrieval Service 106, License Retrieval Service 107, Quality Retrieval Service 108, Security Retrieval Service 109, and Source Details Retrieval Service 110. The System 100 also includes Results Information Widget Generator 111, Software Information Crawler 112, Database 113, File Storage 114, and Search System 101, which are a unique set of components to perform the task of Display of Search Item Scores and Related Information for Easier Search Result Selection, given the list of software components from the search system 101. The Service Containers 120 may include additional services that are not shown in FIG. 1.

In the embodiment shown in FIG. 1, the Search System 101 captures and transmits the search request, listing needs and the user preferences. Post processing of the request, the Search System 101 incorporates and displays the listing widget that it receives.

The request from Search System 101 goes to the API Hub 102 which acts as a gateway for accepting and transmitting all web service requests. The API Hub 102 hosts the web services for taking the requests and creating request messages to be put into the Messaging Bus 103. The Messaging Bus 103 provides for event driven architecture thereby enabling long running processes to be decoupled from requesting system's calls. This decoupling will help the system to service the request and notify calling system once the entire process of generating the filter is completed. There are job listeners configured to listen to the messages in the Messaging Bus 103.

The Results Information Builder 104 decides on the list of information required and template based on the search request, type of listing required and user preferences. User preferences can be explicit choices or can be machine learnt based on user behavior of that user or a set of users using information in equivalent listings. The Results Information Builder 104 will decide the parameters that need to be used for this listing such as but not limited to programming language, ecosystem information such as popularity, support, licensing information, quality, security, and diverse sources of that software component.

The Results Information Builder 104 coordinates with different services such as Language Retrieval Service 105, Ecosystem Retrieval Service 106, License Retrieval Service 107, Quality Retrieval Service 108, Security Retrieval Service 109, and Source Details Retrieval Service 110 to collate the information details to be created in the widget. The Results Information Builder 104 calls the different services based on the type of information that needs to be used for the current user search.

The Language Retrieval Service 105 leverages machine learning technologies to provide the most relevant programming language or programming languages that the input software component is available based on the context of the user. The same software can be available in multiple programming languages or implementation frameworks. The Language Retrieval Service 105 is selected based on the user preference shared or based on this user or other user behavior, according to the technologies that they most frequently use and the context of this search.

The Ecosystem Retrieval Service 106 leverages machine learning technologies to compute the ecosystem score for the software component. The ecosystem score is built based on the software popularity, the number of downloads, number of answered questions and the rate of closure of issues.

The License Retrieval Service 107 leverages machine learning technologies to provide the most relevant licenses that the input software component is available based on the context of the user. The same software can be available under multiple licenses based on the commercial construct that the user is leveraging, and their implementation context. It is selected based on the user preference shared or based on this user or other user behavior, according to the licenses that they most frequently use and the context of this implementation. Based on the license applicability to this context, non-conformant license types are paired with an alert icon to help the user decide accordingly. In other words, the License Retrieval Service 107 prioritizes and interprets licenses based on the commercial construct that the user is leveraging, and their implementation context The Quality Retrieval Service 108 leverages machine learning technologies to compute the quality score for the software component. The quality score is built based on the total number of bugs, open bugs, software code scan performance and the rate of closure of issues.

The Security Retrieval Service 109 leverages machine learning technologies to compute the quality score for the software component. The security score is built based on the total number of bugs, open bugs, software code scan performance and the rate of closure of issues.

The Source Details Retrieval Service 110 leverages machine learning technologies to retrieve and provide the most relevant sources where the input software component is available based on the context of the user. The same software component can be available with multiple hosting providers and in multiple formats such as source code, API, library etc. It is selected based on the user preference shared or based on this user or other user behavior, according to the sources that they most frequently use and the context of this search. From these sources the relevant software component summary, the author's name and last updated date are retrieved, and the last updated date is translated to an easy to compare format such as number of days ago.

Results Information Widget Generator 111 takes the consolidated information parameters from the different information component services that have been processed by Results Information Builder 104 and converts it to the format required by the Search System 101. These formats are, but not limited to messages such as JSON, XML or fully usable UI components across the computer, tablet, mobile screens in a responsive technology such as React.

The File Storage 114 is used to store document type of data, source code files, documents, readme files, installation guides, user guides, neural network models etc.

The Database 115 is a relational database system (RDBS) like MySQL to store all meta-data pertaining to the requests received from the search system 101, messaging bus, request processor and from other system components described above. The meta-data includes details of every request to identify who submitted it, requested details to track the progress as the System processes the request through its different tasks. The status of each execution step in entire process is stored in this database to track and notify the system on completion.

The Software Information Crawler 112 crawls (or searches or scans) the internet sources such as, but not limited to public repositories, cloud providers, Q&A, review sites, vulnerability databases to parse and store information on programming language, licenses, sources, support, popularity, quality, and security information into the File Storage 114.

Figure 2:
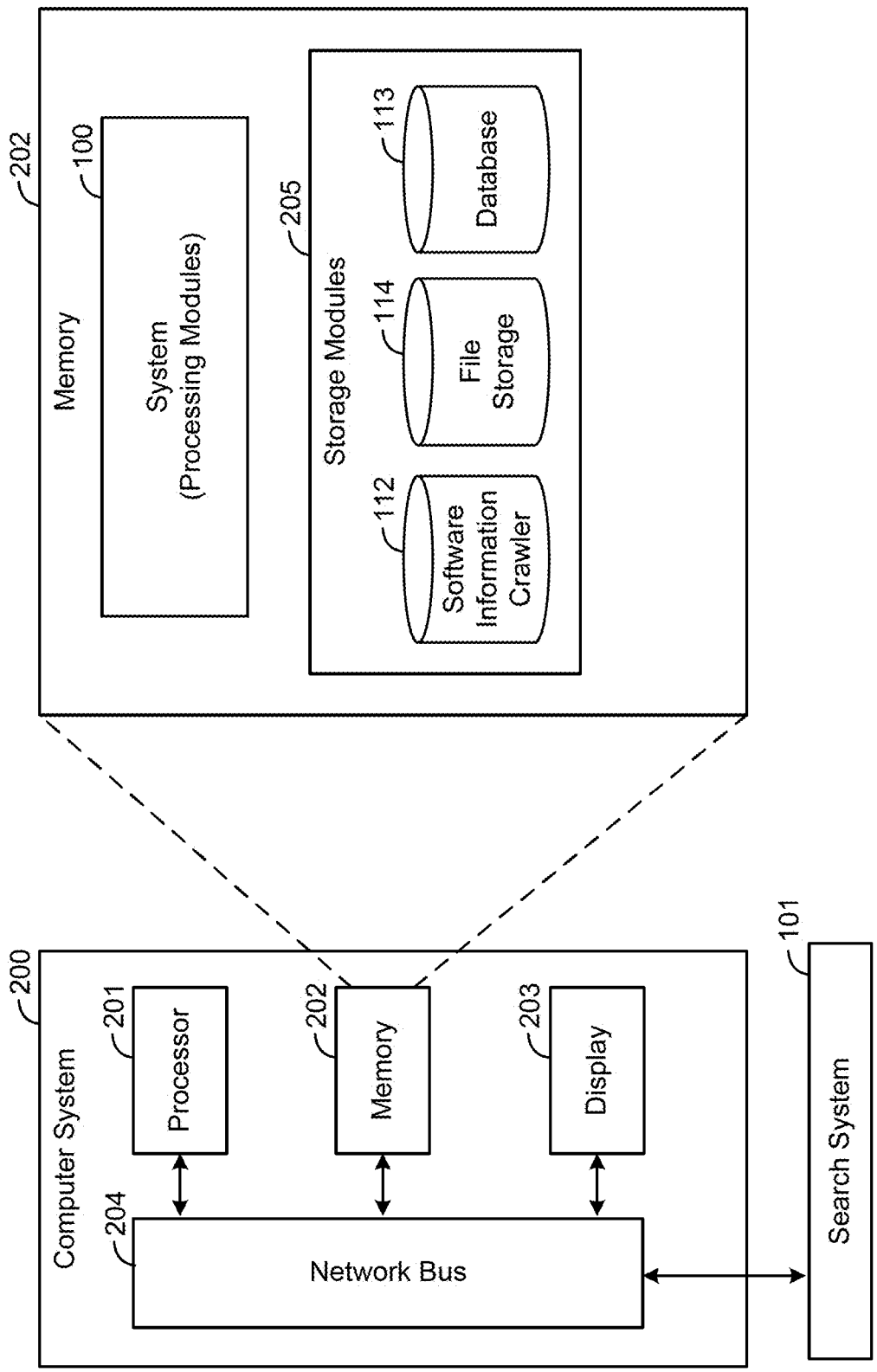
FIG. 2 shows an example computer system implementation for display of search item scores and related information for easier search result selection, in accordance with some embodiments.

FIG. 2 shows a block view of the computer system 200 for displaying search item scores and related information for easier search result selection, in accordance with some embodiments. This may include a Processor 201, Memory 202, Display 203, Network Bus 204, and other input/output like a microphone, speaker, wireless card, etc. The processing modules of System 100, Software Information Crawler 112, Database 113, File Storage 114, are stored in the Memory 202 which provides the necessary machine instructions to the Processor 201 to perform the executions for display of search item scores and related information for easier search result selection. In some embodiments, the Processor 201 controls the overall operation of the system and managing the communication between the components through the Network Bus 204. The Memory 202 holds the display of search item scores and related information for easier search result selection system code, data, and instructions of the system processing modules 100 and of diverse types of the non-volatile memory and volatile memory. The external Search System 101 interacts via the Network Bus 204.

Figure 3:
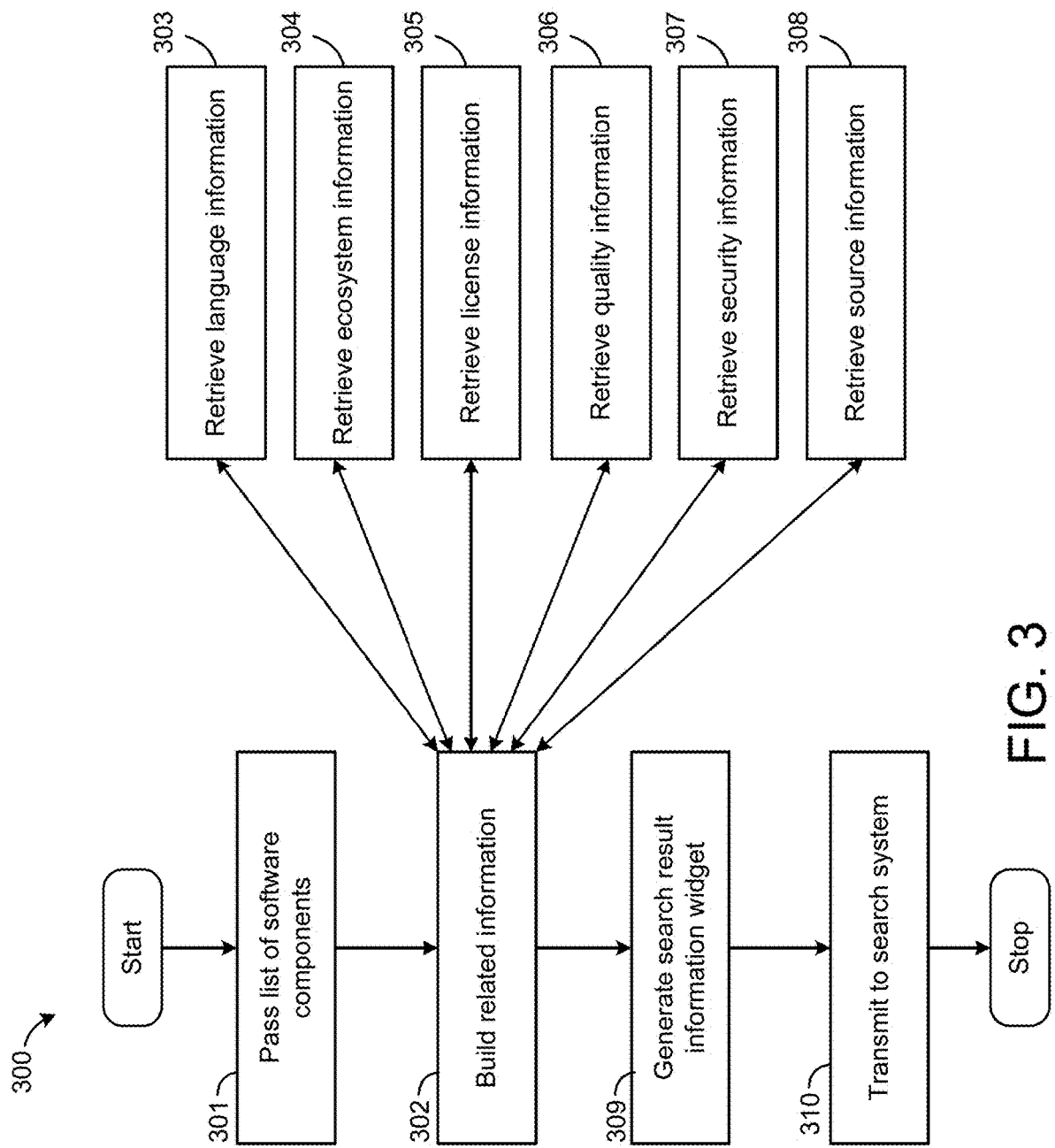
FIG. 3 shows the overall process flow of display of search item scores and related information for easier search result selection, in accordance with some embodiments.

FIG. 3 shows a process 300 for displaying search item scores and related information for easier search result selection, in accordance with some embodiments. In step 301, the search request, information listing needs, and the user preferences are captured from the search system 101 and sent downstream. In step 302, the type of information required for the components are decided and it calls multiple steps in series or in parallel to gather the different information to build related information. In step 303, the language details of the software component are retrieved. In step 304, the ecosystem information of the software component such as popularity and usage information are retrieved and computed. In step 305, the software component license information is retrieved and shortlisted in the context of the user and search. In step 306, the software component quality measures are retrieved, and the quality score is computed. In step 307, the software component security measures are retrieved, and the security score is computed. In step 308, the software component availability and recently updated information is retrieved based on the most relevant sources for this user and search. In step 309, based on these details, scores and information widget are generated and, in step 310, the search result information widget is transmitted back to the Search System 101 for viewing by the user.

Figure 4:
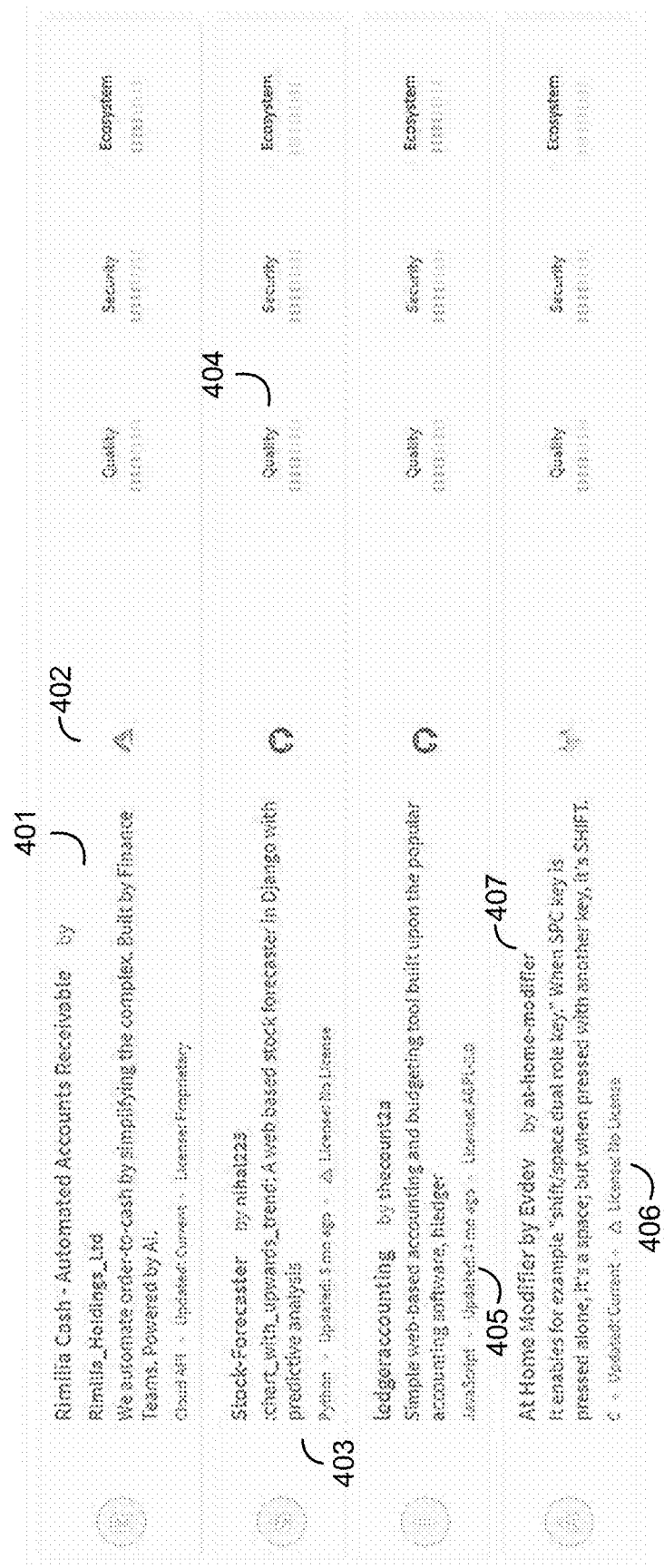
FIG. 4 shows an example of implementation of display of search item scores and related information for easier search result selection, in accordance with some embodiments.

FIG. 4 shows an example widget 400 which is an implementation based on certain information needs requested by the Search System 101, in accordance with some embodiments. It shows the different information snippets assembled to enable easier decision making, and as an example, of additional component summary 401, source shown as an icon to the user for easier review 402, relevant programming language for the software component 403, the quality, security, ecosystem scores converted to an easy to review and compare graphic 404, the recency in which the software component was updated translated to an easier readable format 405, the license type along with an alert for non-conformant licenses 406, and the software component author 407.

Figure 5:
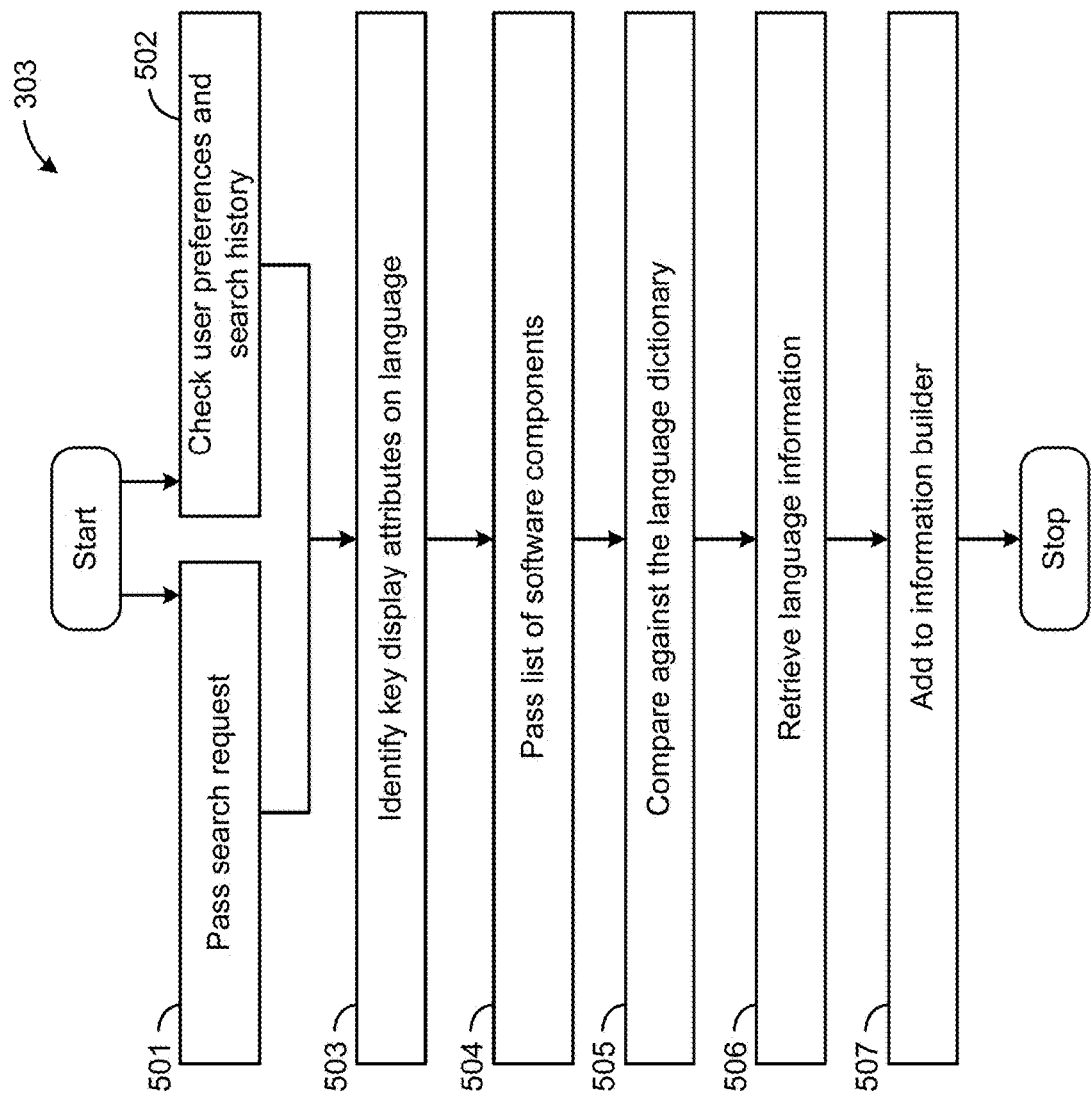
FIG. 5 shows an example of implementation of language information retrieval for easier search result selection, in accordance with some embodiments.

FIG. 5 shows details of step 303 of how language information is retrieved and sent to search system 101, in accordance with some embodiments. Step 303 leverages machine learning technologies to identify and recommend the user for easy reuse of libraries. The process includes passing the search query in step 501, checking the user preferences and search history based on the available data in step 502, identifying the display attribute pertaining to language information in step 503, passing the list of software components in step 504, comparing against the available language dictionary in step 505, retrieve the language information in step 506, add it to the information builder in step 507 and Search Result Information Widget and transmit to Search System 101. In step 505, machine language techniques are used in the recommendation process and classification based on the available languages as part of the system dictionary. The dictionary is a preloaded information about the languages available in the technology world.

Figure 6:
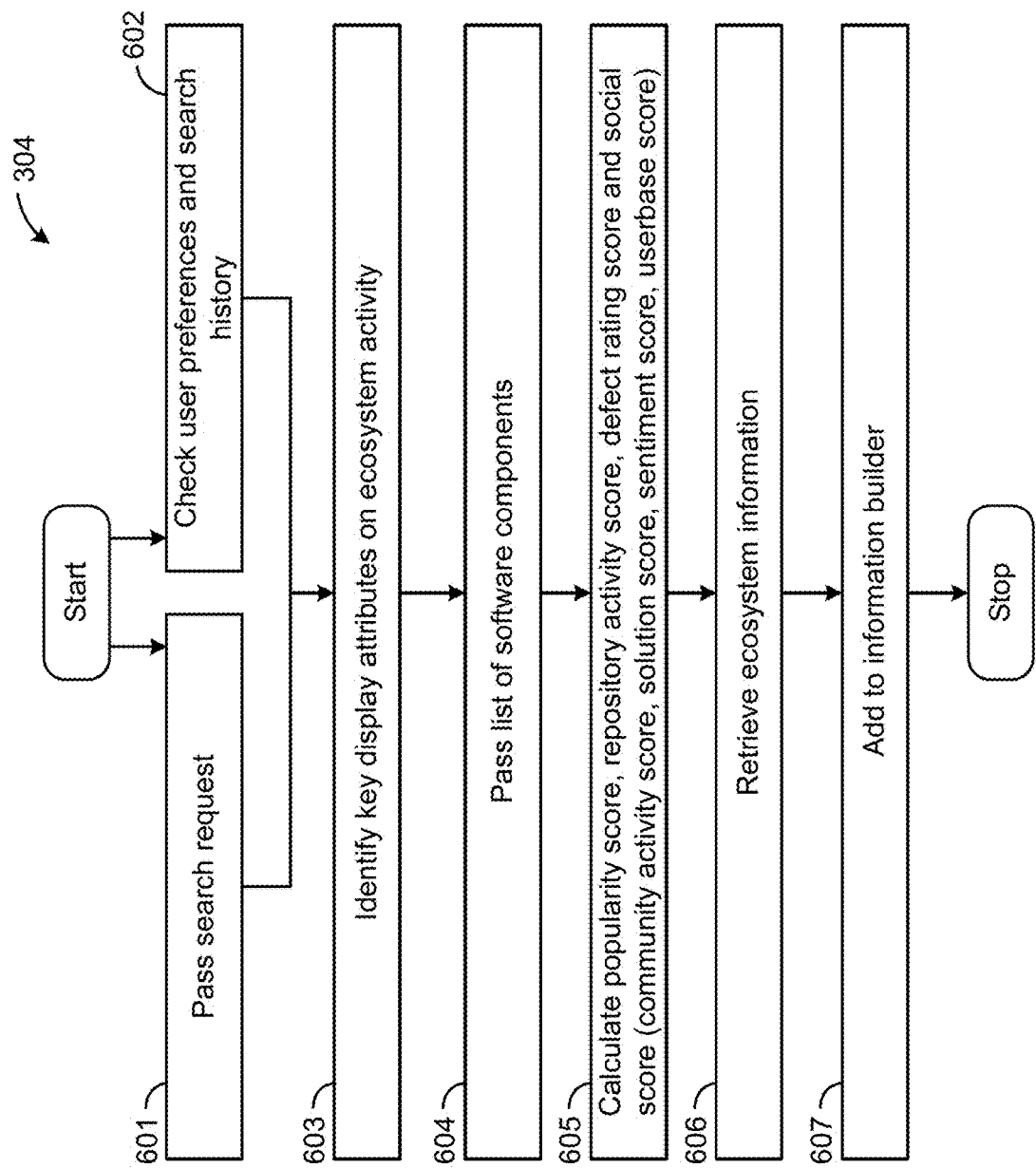
FIG. 6 shows an example of implementation of ecosystem information retrieval for easier search result selection, in accordance with some embodiments.

FIG. 6 shows details of step 304 of how ecosystem activity information is retrieved and sent to search system 101, in accordance with some embodiments. Step 304 leverages machine learning technologies to identify and recommend the user for easy reuse of libraries. The process includes passing the search query in step 601, checking the user preferences and search history based on the available data in step 602, identifying the display attribute pertaining to ecosystem activity information in step 603, pass the list of software components in step 604, pass the scores based on preference, retrieve the ecosystem activity information in step 605, add it to the information builder in step 607 and Search Result Information Widget and transmit to search system 101. In step 605, the machine language technique used are recommendation process and classification based on the available languages as part of the scores available as part of Ecosystem activity score calculation process. The calculation of different score involved for this step are Popularity Score, Repository Activity Score, Defect Rating Score and Social Score (Community Activity Score, Solution Score, Sentiment Score, Userbase Score) available for various project repositories in step 605.

Figure 7:
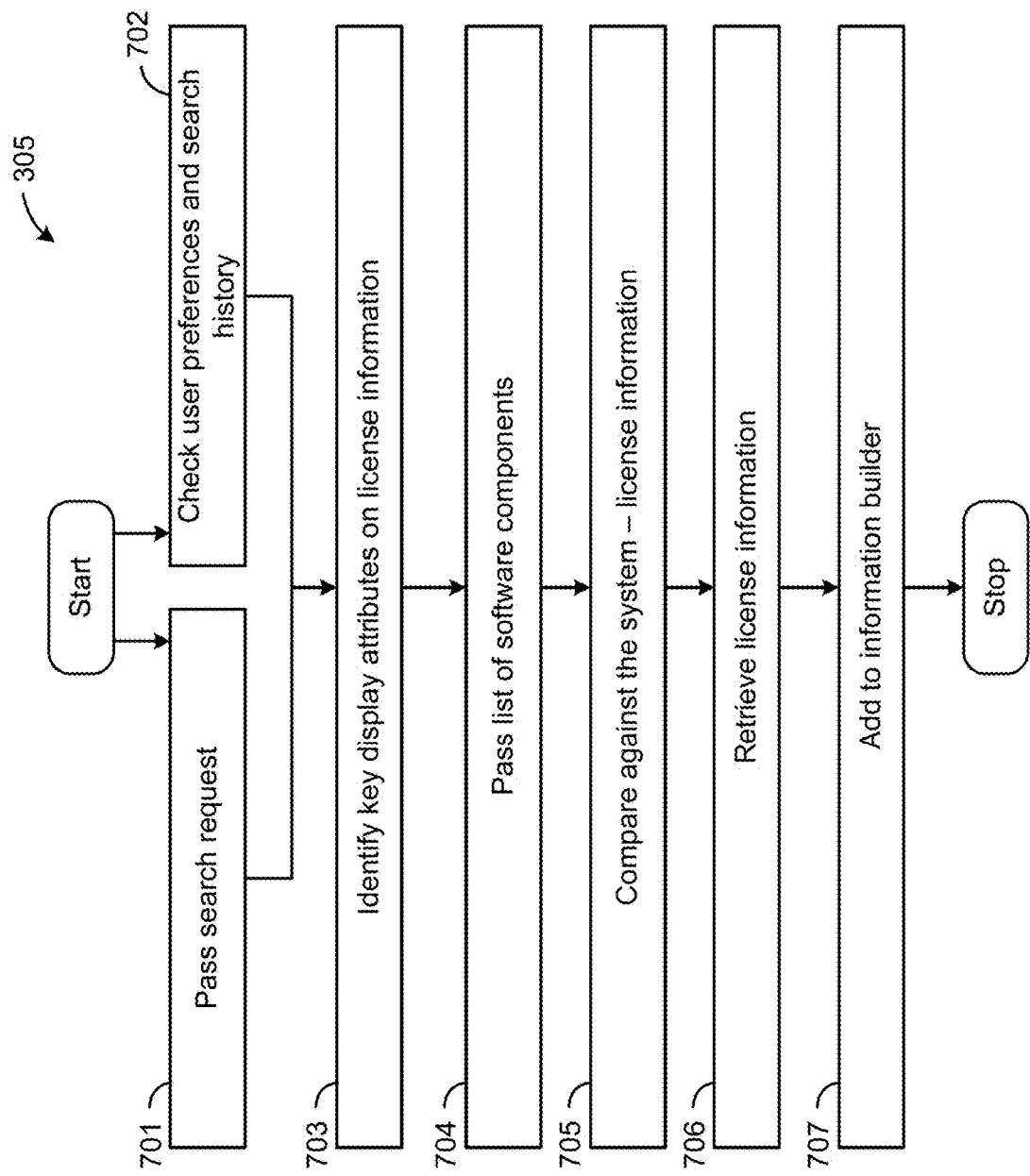
FIG. 7 shows an example of implementation of license information retrieval for easier search result selection, in accordance with some embodiments.

FIG. 7 shows details of step 305 of how license information is retrieved and sent to search system 101, in accordance with some embodiments. Step 305 leverages machine learning technologies to identify and recommend the user for easy reuse of libraries. The process includes passing the search query in step 701, checking the user preferences and search history based on the available data in step 702, identifying the display attribute pertaining to license information in step 703, pass the list of software components in step 704, comparing against the available dictionary in step 705, retrieve the license information in step 706, add it to the information builder in step 707 and Search Result Information Widget and transmit to search system 101. In step 705, the machine language technique used are recommendation process and classification based on the available licenses as part of the system dictionary. The dictionary is a preloaded information about the licenses available in the technology world.

Figure 8:
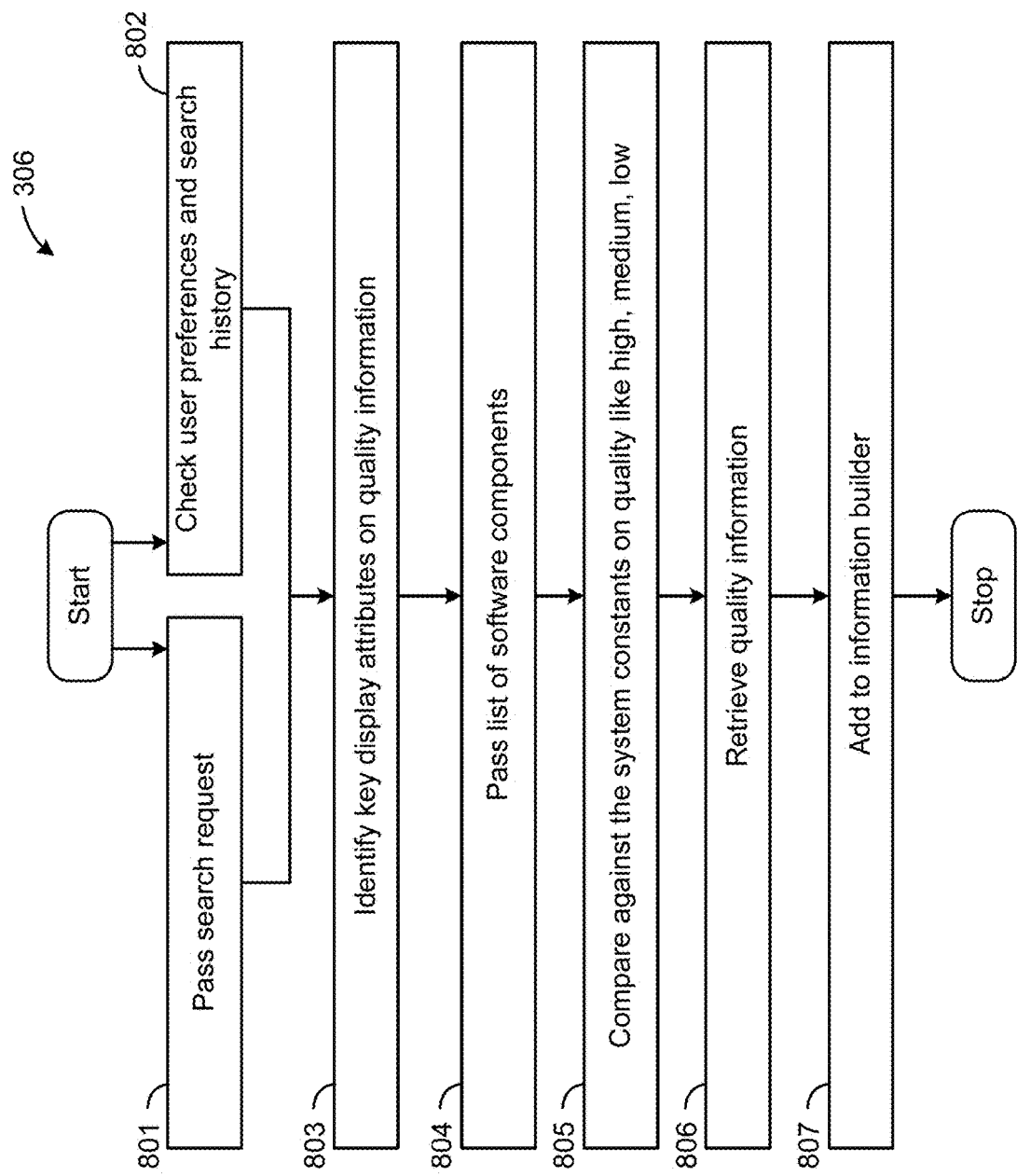
FIG. 8 shows an example of implementation of quality information retrieval for easier search result selection, in accordance with some embodiments.

FIG. 8 shows details of step 306 of how quality information is retrieved and sent to search system 101, in accordance with some embodiments. In 306 leverages machine learning technologies to identify and recommend the user for easy reuse of libraries. The process includes passing the search query in step 801, checking the user preferences and search history based on the available data in step 802, identifying the display attribute pertaining to quality constants in step 803, pass the list of software components in step 804, comparing against the constants in step 805, retrieve the quality information in step 806, add it to the information builder in step 807 and Search Result Information Widget and transmit to search system 101. In step 805, the machine language technique used are recommendation process and classification based on the available quality constants like High, Medium, and Low. The constants are preloaded information about the quality available in the technology world.

Figure 9:
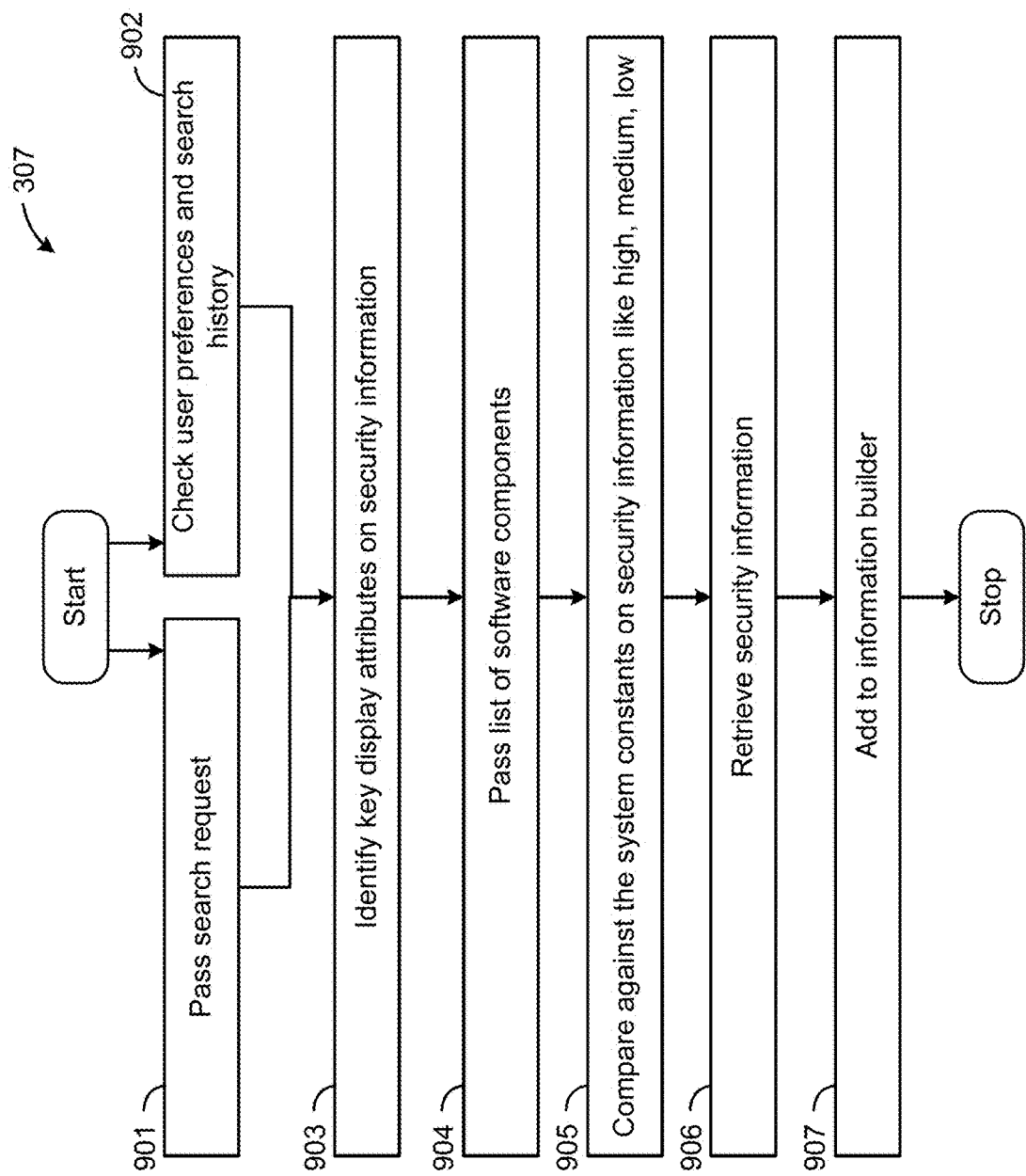
FIG. 9 shows an example of implementation of security information retrieval for easier search result selection, in accordance with some embodiments.

FIG. 9 shows details of step 307 of how security information is retrieved and sent to search system 101, in accordance with some embodiments. Step 306 leverages machine learning technologies to identify and recommend the user for easy reuse of libraries. The process involves passing the search query in step 901, checking the user preferences and search history based on the available data in step 902, identifying the display attribute pertaining to security constants in step 903, pass the list of software components in step 904, comparing against the constants in step 905, retrieve the security information in step 906, add it to the information builder in step 907 and Search Result Information Widget and transmit to search system 101. In step 905, the machine language technique used are recommendation process and classification based on the available security constants like High, Medium, and Low. The constants are preloaded information about the security available.

Figure 10:
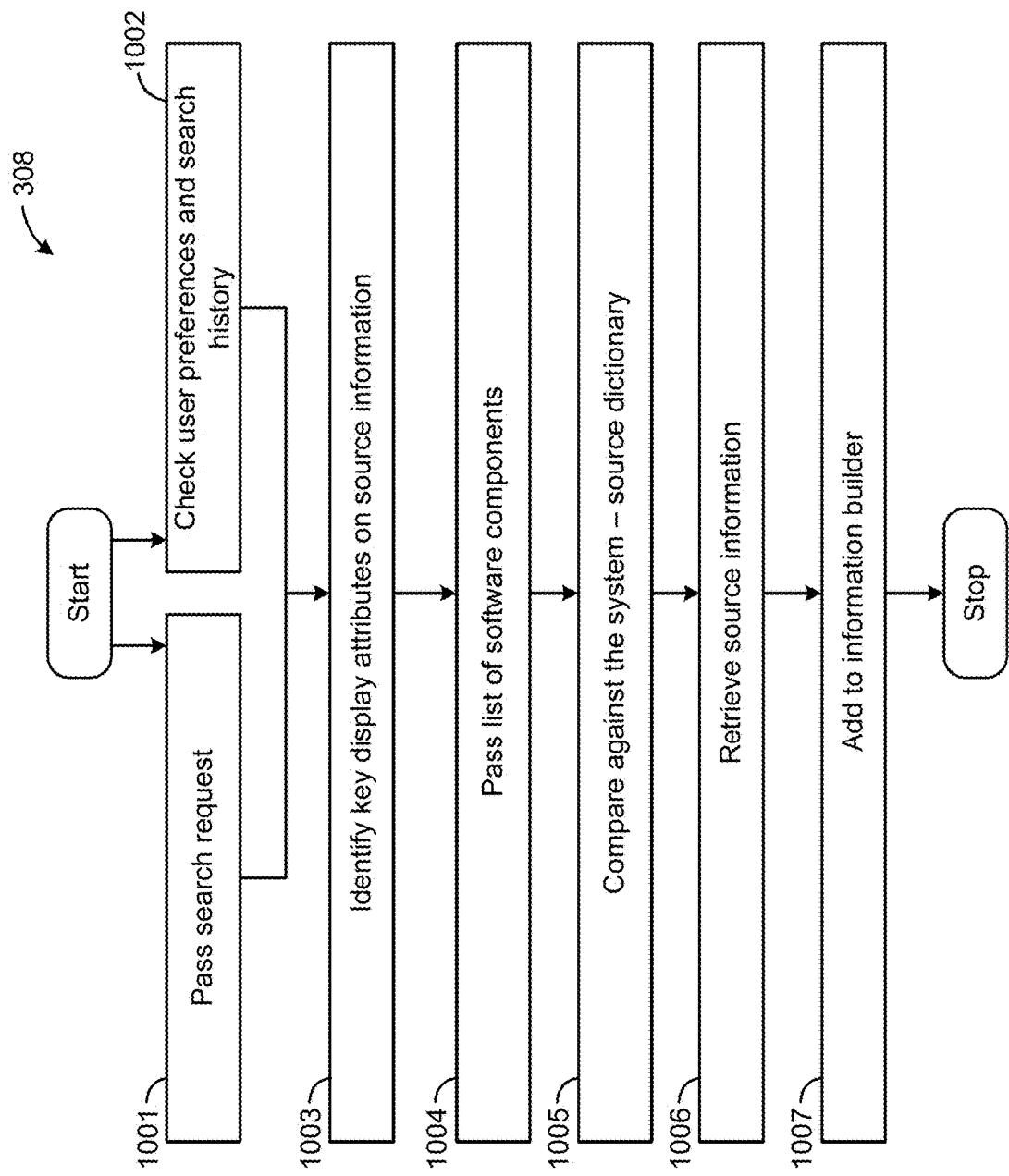
FIG. 10 shows an example of implementation of source information retrieval for easier search result selection, in accordance with some embodiments.

FIG. 10 shows details of step 308 of how source information is retrieved and sent to search system 101, in accordance with some embodiments. Step 306 leverages machine learning technologies to identify and recommend the user for easy reuse of libraries. The process includes passing the search query in step 908, checking the user preferences, and search history based on the available data in step 909, identifying the display attribute pertaining to source information in step 910, pass the list of software components in step 911, comparing against the list of sources in step 912, retrieve the source information in step 913, add it to the information builder in step 914 and Search Result Information Widget and transmit to search system. In step 912, the machine language technique used are recommendation process and classification based on the available sources in the technology world.

Figure 11:
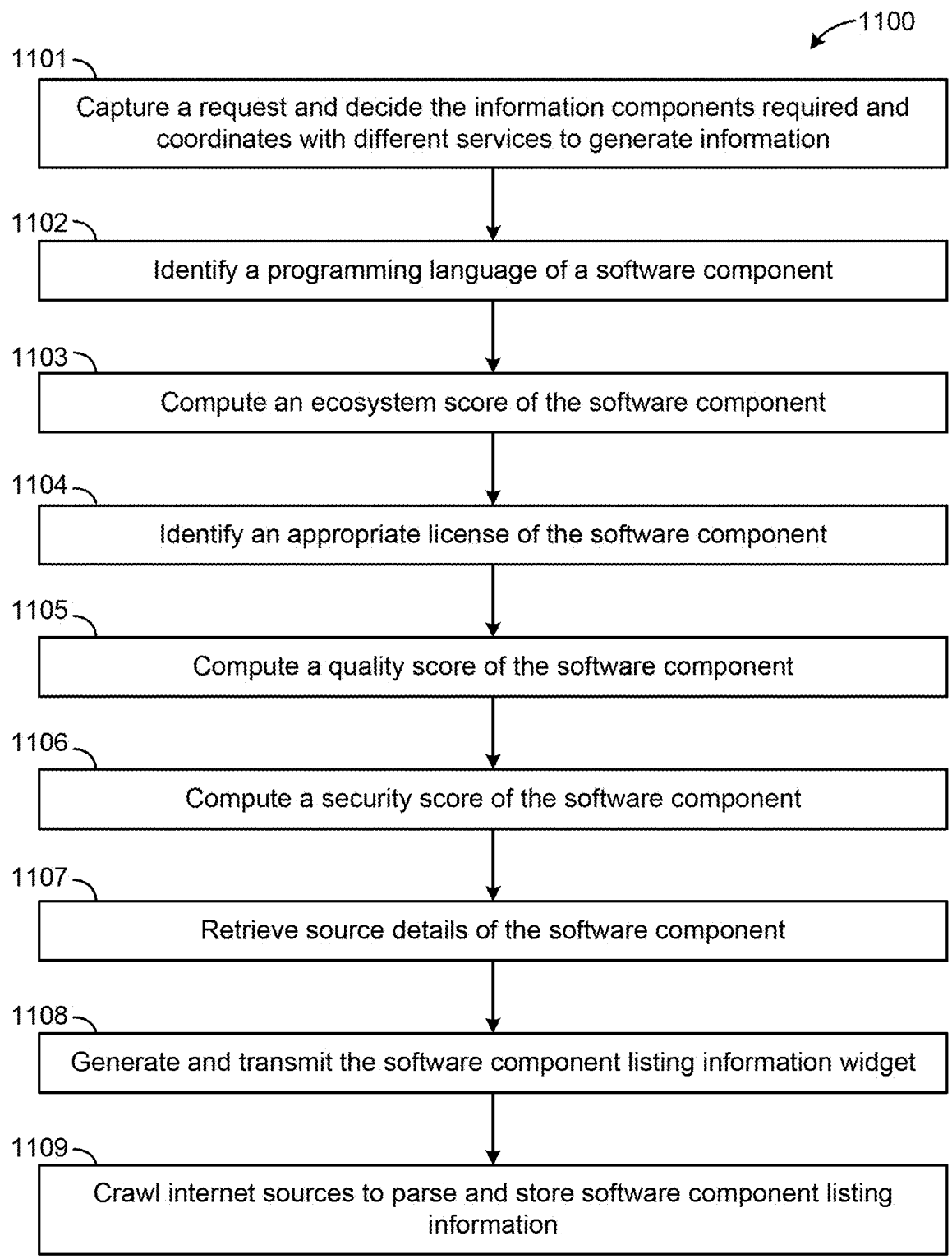
FIG. 11 shows method of display of search item scores and related information for easier search result selection, in accordance with some embodiments.

FIG. 11 shows a method 1100 of displaying search item scores and related information for easier search result selection, in accordance with some embodiments. At least one processor is provided that operates under control of a stored program comprising a sequence of program instructions including multiple steps. Step 1101 includes capturing a search request and decide the information components required and coordinates with different services to generate information. Step 1102 includes identifying a programming language of a software component. Step 1103 includes computing an ecosystem score of the software component. Step 1104 includes identifying an appropriate license of the software component. Step 1105 includes computing a quality score of the software component. Step 1106 includes computing a security score of the software component. Step 1107 includes retrieving source details of the software component. Step 1108 includes generating and transmitting listing information widget associated with the software component. Step 1109 includes crawling internet sources to parse and store software component listing information.

Figure 12:
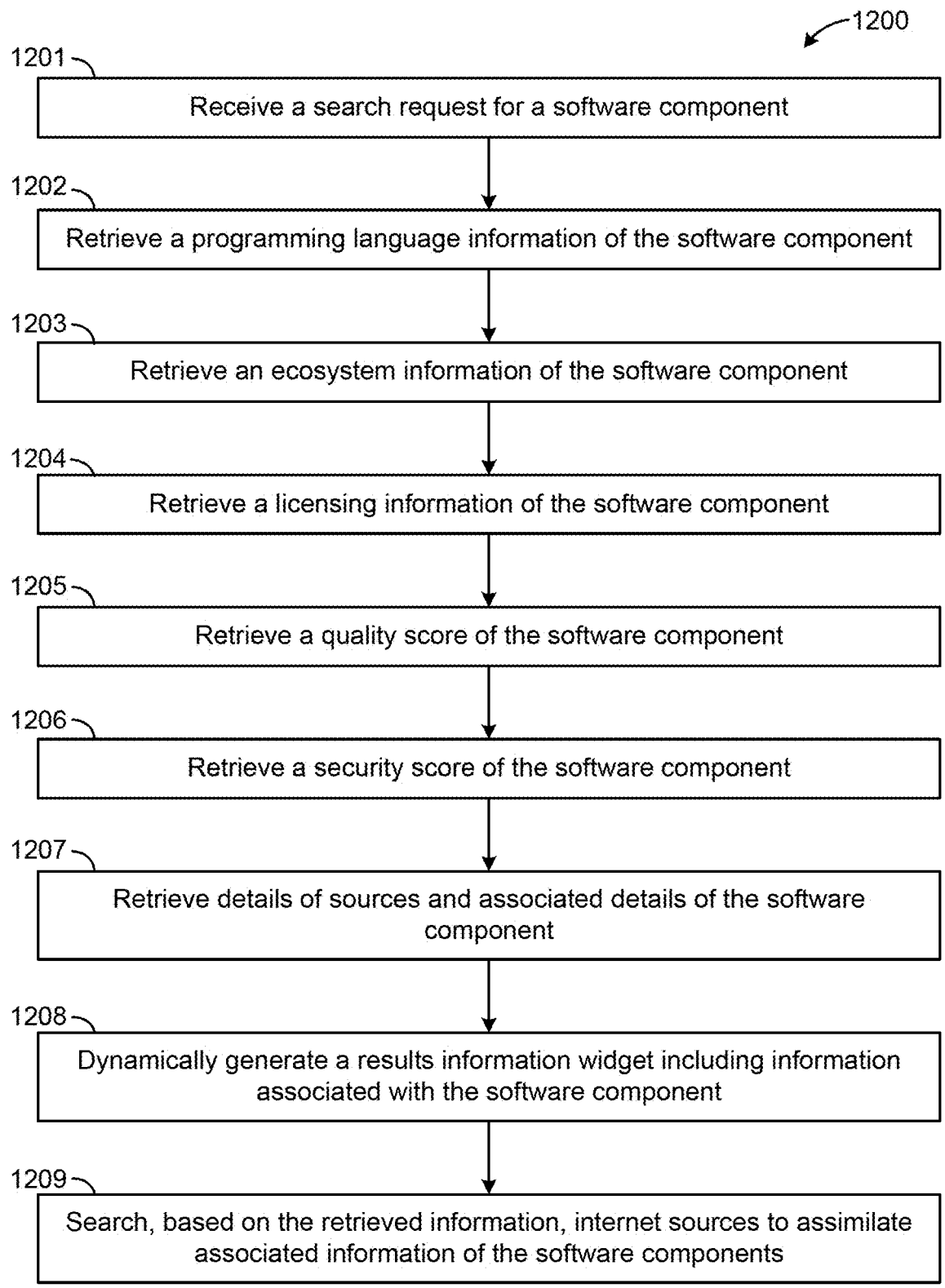
FIG. 12 shows a flow diagram showing another method of displaying searching item scores and related information, in accordance with some embodiments.

FIG. 12 shows a process 1200 that can be performed by a computer program product for displaying search item scores and related information for easier search result selection, in accordance with some embodiments. Process 1200 can be performed by one or more components of system 100 as previously described. The computer program product for automated software natural language documentation comprises a processor and memory storing instructions. The instructions when executed by the processor causes the processor to perform multiple steps. The processor receives a search request for a software component (step 1201). The processor then retrieves a programming language information of the software component (step 1202); retrieves an ecosystem information of the software component (step 1203); retrieves a licensing information of the software component (step 1204); retrieves a quality score of the software component (step 1205); retrieves a security score of the software component (step 1206); and retrieves details of sources and associated details of the software component (step 1207). The processor dynamically generates a results information widget including information associated with the software component (step 1208) and searches, based on the retrieved information, internet sources to assimilate associated information of the software components (step 1209).

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the order shown, or sequential order, to achieve desirable results. In addition, other actions may be provided, or actions may be eliminated, from the described flows, and other components may be added to, or removed from, the described systems. Accordingly, other implementations are within the scope of the following claims.

As multiple embodiments of the present disclosure have been elaborated above, it should be construed that they have been described by way of example alone, and not by way of limitation. Hence, the scope of the present disclosure should not be limited by any of the exemplary embodiments. Additionally, the disclosure is defined above in terms of multiple exemplary embodiments and applications. It should be understood that the several features and the functionality explained in one or more of the distinct embodiments are not limited in their applicability to the specific embodiment with which they are explained, but instead can be functional, by itself or in a defined combination, to one or more of the other embodiments of the disclosure, whether or not such embodiments are explained and whether or not such aspects are presented as being a part of a described embodiment.

What is claimed is:

1. A system for displaying search item scores and related information for easier search result selection, the system comprising:
   one or more processors and memory storing instructions that, when executed by the one or more processors, cause the one or more processors to perform operations comprising:
      receiving a search request for a software component;
      retrieving a programming language information of the software component;
      retrieving an ecosystem information of the software component;
      retrieving a licensing information of the software component;
      retrieving a quality score of the software component;
      retrieving a security score of the software component;
      retrieving details of sources and associated details of the software component;
      dynamically generating a results information widget including information associated with the software component; and
      searching, based on the retrieved information, internet sources to assimilate associated information of the software components.

2. The system of claim 1, the operations further comprising:
   determining a list of the information required and template based on the search request, type of listing required, and user preferences, wherein the user preferences are one of explicit choices and machine learnt based on user behavior of that user or a set of users using information in equivalent listings; and
   determining parameters that need to be used for this list of the information that comprise programming language, ecosystem information, licensing information, quality, security, and diverse sources of that software component.

3. The system of claim 2, the operations further comprising:
provide, based on results of a machine learning model, most relevant one or more programming languages that the software component is available based on context of the user including software programming languages, technologies, and frameworks; and
down-selecting based on the user preference shared or based on this user or other user behavior, according to the technologies that most frequently used and context of the search.

4. The system of claim 1, the operations further comprising generating an ecosystem score, based on results of a machine learning model, for the software component, wherein the ecosystem score is built based on one or more of software popularity, number of downloads, number of answered questions, or rate of closure of issues.

5. The system of claim 3, the operations further comprising:
providing, based on results of a machine learning model, the most relevant licenses that the software component is available based on the context of the user;
interpreting licenses, based on the commercial construct that the user is leveraging, and their implementation context;
down-selecting based on the user preference shared or based on this user or other user behavior, according to the licenses that are most frequently used and the context of the implementation; and
displaying an alert icon to help the user decide, if based on the license applicability to the context of the search, the license type is non-conformant.

6. The system of claim 1, the operations further comprising computing a quality score, based on results of a machine learning model, for the software component, wherein the quality score is built based on one or more of total number of bugs, open bugs, software code scan performance, or rate of closure of issues.

7. The system of claim 1, the operations further comprising computing, based on results of a machine learning model, a security score for the software component, wherein the security score is built based on one or more of total number of bugs, open bugs, software code scan performance, or rate of closure of issues.

8. The system of claim 1, the operations further comprising:
providing, based on results of a machine learning model, most relevant sources where the software component is available based on the context of the user;
comparing the same software component available with a plurality of hosting providers and in multiple formats that comprise source code, API, and library;
down-selecting based on one of the user preferences shared and based on this user or other user behavior, according to the sources that are most frequently used and the context of this search; and
retrieving relevant software component summary, author's name and last updated date.

9. The system of claim 1, the operations further comprising:
consolidating the retrieved information; and
converting the consolidated information to a format including one or more messages comprising JSON, XML, or fully usable UI components across the computer, tablet, mobile screens in a responsive technology.

10. The system of claim 1, the operations further comprising:
crawling internet sources that comprise public repositories, cloud providers, Question and Answers (Q&A), review sites, and vulnerability databases;
parsing and storing information on programming language, licenses, sources, support, popularity, quality, and security information into a file storage.

11. A method of displaying search item scores and related information for easier search result selection, the method comprising:
receiving a search request for a software component;
retrieving a programming language information of the software component;
retrieving an ecosystem information of the software component;
retrieving a licensing information of the software component;
retrieving a quality score of the software component;
retrieving a security score of the software component;
retrieving details of sources and associated details of the software component;
dynamically generating a results information widget including information associated with the software component; and
searching, based on the retrieved information, internet sources to assimilate associated information of the software components.

12. The method of claim 11, further comprising determining a list of the information required and template based on the search request, type of listing required, and user preferences.

13. The method of claim 12, further comprising processing user preferences that comprise one of explicit choices, machine learnt based on user behavior of that user, and a set of users using information in equivalent listings.

14. The method of claim 13, further comprising determining parameters that need to be used for the equivalent listings that comprises programming language, ecosystem information, licensing information, quality, security, and diverse sources of that software component.

15. The method of claim 11, further comprising providing, based on results of a machine learning model, the most relevant one or more programming languages, wherein the software component is available based on a context of the user covering all software programming languages, technologies and frameworks; and
down-selecting based on one of the user preference shared and this user or other user behavior, according to the technologies that are most frequently used and the context of this search.

16. The method of claim 11, further comprising computing, based on results of a machine learning model, the ecosystem score for the software component based on one or more of the software popularity, number of downloads, number of answered questions, or rate of closure of issues.

17. The method of claim 11, further comprising providing, based on results of a machine learning model, most relevant licenses, wherein the software component is available based on the context of the user, which is prioritized and interpreted based on the commercial construct that the user is leveraging and their implementation context, and further down-selected based on one of the user preference shared and this user or other user behavior, according to the licenses that are most frequently used and the implementation context, and providing an alert based on non-conformant licenses.

18. The method of claim 11, further comprising computing, based on results of a machine learning model, a quality score for the software component based on one or more of total number of bugs, open bugs, software code scan performance, or rate of closure of issues.

19. The method of claim 11, further comprising computing, based on results of a machine learning model, a security score for the software component based on total number of bugs, open bugs, software code scan performance and rate of closure of issues.

20. The method of claim 11, further comprising
providing, based on results of a machine learning model, most relevant sources where the software component is available based on the context of the user across multiple hosting providers and in multiple formats comprising source code, API, library;
down-selecting based on one of the user preference shared and on this user or other user behavior, according to the sources that are most frequently used and the context of this search; and
retrieving relevant software component summary, author name and last updated date and the last updated date translated to an easy to compare format that is similar to number of days ago.

21. The method of claim 11, further comprising:
consolidating information parameters from different information component services that have been processed; and
converting the consolidated information parameters to a format required comprising one of JSON, XML, and fully usable UI components across the computer, tablet, mobile screens in a responsive technology.

22. The method of claim 11, further comprising:
crawling internet sources that comprise public repositories, cloud providers, Q&A, review sites, vulnerability databases; and
parsing and storing information on the programming language, licenses, sources, support, popularity, quality, and security information into a file storage.

23. A computer program product for displaying search item scores and related information for easier search result selection comprising a processor and memory storing instructions thereon, wherein the instructions when executed by the processor cause the processor to perform operations comprising:
receiving a search request for a software component;
retrieving a programming language information of the software component;
retrieving an ecosystem information of the software component;
retrieving a licensing information of the software component;
retrieving a quality score of the software component;
retrieving a security score of the software component;
retrieving details of sources and associated details of the software component;
dynamically generating a results information widget including information associated with the software component; and
searching, based on the retrieved information, internet sources to assimilate associated information of the software components.

* * * * *